United States Patent
Lee et al.

(10) Patent No.: US 11,476,511 B2
(45) Date of Patent: Oct. 18, 2022

(54) THERMAL MANAGEMENT SYSTEM FOR VEHICLE BATTERY AND METHOD OF CONTROLLING THE SAME

(71) Applicants: Hyundai Motor Company, Seoul (KR); KIA Motors Corporation, Seoul (KR)

(72) Inventors: Sang Shin Lee, Suwon-si (KR); Man Ju Oh, Yongin-si (KR); So La Chung, Seoul (KR); Jae Woong Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 421 days.

(21) Appl. No.: 16/687,253

(22) Filed: Nov. 18, 2019

(65) Prior Publication Data
US 2021/0013559 A1    Jan. 14, 2021

(30) Foreign Application Priority Data
Jul. 11, 2019 (KR) .......................... 10-2019-0084026

(51) Int. Cl.
| | |
|---|---|
| F28F 7/00 | (2006.01) |
| H01M 10/613 | (2014.01) |
| B60L 58/26 | (2019.01) |
| B60L 50/64 | (2019.01) |
| B60L 53/302 | (2019.01) |

(Continued)

(52) U.S. Cl.
CPC .......... *H01M 10/613* (2015.04); *B60L 50/64* (2019.02); *B60L 53/16* (2019.02); *B60L 53/18* (2019.02); *B60L 53/302* (2019.02); *B60L 58/26* (2019.02); *H01M 10/44* (2013.01);
(Continued)

(58) Field of Classification Search
CPC ........ B60L 50/64; B60L 53/302; B60L 53/16; B60L 58/26; B60L 53/18
See application file for complete search history.

(56) References Cited

U.S. PATENT DOCUMENTS

| | | | |
|---|---|---|---|
| 9,701,210 B2 | 7/2017 | Woo et al. | |
| 11,180,043 B2 * | 11/2021 | Rönfanz | H01R 13/665 |

(Continued)

FOREIGN PATENT DOCUMENTS

KR    10-2004-0031196 A    4/2004

*Primary Examiner* — Henry T Crenshaw
*Assistant Examiner* — Kamran Tavakoldavani
(74) *Attorney, Agent, or Firm* — Lempia Summerfield Katz LLC

(57) ABSTRACT

A thermal management system for a vehicle battery is disclosed. The system includes a reservoir tank, which is positioned outside a vehicle and which stores refrigerant therein, a refrigerant supply line for supplying the refrigerant from the reservoir tank to a heat exchange circuit, which exchanges heat with the battery mounted in the vehicle, a refrigerant recovery line for recovering the refrigerant discharged from the heat exchanger circuit, a cable, which is connected at one end thereof to the reservoir tank and which includes therein the refrigerant supply line or the refrigerant recovery line, and a connector provided at a remaining end of the cable, which serves to connect the refrigerant supply line or the refrigerant recovery line in the cable to an inlet or an outlet of the heat exchange circuit when the connector is coupled to the vehicle.

15 Claims, 7 Drawing Sheets

(51) Int. Cl.
*B60L 53/16* (2019.01)
*H01M 10/44* (2006.01)
*H01M 10/625* (2014.01)
*H01M 10/63* (2014.01)
*B60L 53/18* (2019.01)

(52) U.S. Cl.
CPC ......... *H01M 10/625* (2015.04); *H01M 10/63* (2015.04); *H01M 2220/20* (2013.01)

(56) References Cited

U.S. PATENT DOCUMENTS

2013/0029193 A1* 1/2013 Dyer ................ H01M 10/6567
                                                                                      180/65.21
2021/0316590 A1* 10/2021 Fuse ...................... B60H 1/323

* cited by examiner

THERMAL MANAGEMENT SYSTEM FOR VEHICLE BATTERY AND METHOD OF CONTROLLING THE SAME

CROSS-REFERENCE TO RELATED APPLICATION

This application claims the priority benefit of Korean Patent Application No. 10-2019-0084026, filed on Jul. 11, 2019 in the Korean Intellectual Property Office, the disclosure of which is incorporated herein by reference.

BACKGROUND

1. Field

The present relates to a thermal management system for a vehicle battery and a method of controlling the same.

2. Description of the Related Art

Generally, conventional vehicles are designed to travel on roads or rails using power obtained by converting heat energy, obtained by burning fuel such as diesel and other fossil fuels, into mechanical energy.

However, recent vehicles may also be designed to travel on roads and rails using electric energy charged into batteries mounted in the vehicles rather than using power obtained by burning fossil fuel. Such a vehicle, which is designed to obtain power from electric energy, is referred to as an electric vehicle.

Electric vehicles are classified into a typical electric vehicle (EV), which is designed to obtain power only from electric energy, a hybrid electric vehicle (HEV), which is designed to obtain power from both heat energy resulting from burning of fossil fuel and electric energy, a plug-in hybrid electric vehicle (PHEV), which is designed to allow a built-in battery thereof to be charged by external electric energy as well as to obtain power from both heat energy resulting from burning of fossil fuel and electric energy, and the like.

Broadly speaking, a fuel cell electric vehicle (FCEV), which is designed to directly use electric energy generated by charged hydrogen or to use electric energy charged in a battery, may also be included in the electric vehicles.

The disclosure of this section is to provide background information relating to the invention. Applicant does not admit that any information contained in this section constitutes prior art.

SUMMARY

In accordance with aspects of the present invention, a thermal management system for a vehicle battery includes a reservoir tank, which is positioned outside a vehicle and which stores refrigerant therein, a refrigerant supply line for supplying the refrigerant from the reservoir tank to a heat exchange circuit, which exchanges heat with the battery mounted in the vehicle, a refrigerant recovery line for recovering the refrigerant discharged from the heat exchanger circuit, a cable, which is connected at one end thereof to the reservoir tank and which includes therein the refrigerant supply line or the refrigerant recovery line, and a connector provided at a remaining end of the cable, which serves to connect the refrigerant supply line or the refrigerant recovery line in the cable to an inlet or outlet of the heat exchange circuit when the connector is coupled to the vehicle.

The connector may be electrically connected to a charging apparatus, which is positioned outside the vehicle, and the charging apparatus may be electrically connected to the battery when the connector is coupled to the vehicle.

The reservoir tank may be partially or completely buried so as to perform heat exchange between a surface thereof and an ambient environment.

The thermal management system may further include a heat source, which is partially or completely buried so as to exchange heat between the surface thereof and an ambient environment, and the reservoir tank may be connected to the heat source via a heat pump system so as to be maintained at a lower temperature than the heat source.

The mass of the refrigerant stored in the reservoir tank may be greater than the mass of the maximum amount of refrigerant that can be introduced into the heat exchange circuit.

The refrigerant may be supplied in the liquid state through the refrigerant supply line to the heat exchange circuit in which the refrigerant vaporizes, and the refrigerant in the gaseous state may be recovered through the refrigerant recovery line.

The connector may include a first valve, which blocks the refrigerant supply line or the refrigerant recovery line in the cable and which is opened when the connector is coupled to the vehicle.

An inlet or outlet of the heat exchange circuit may be provided with a second valve, which blocks the heat exchange circuit, the second valve being opened when the connector is coupled to the vehicle.

The connector may include therein a first valve for blocking the refrigerant supply line or the refrigerant recovery line in the cable, and the heat exchange circuit may be provided at an inlet or outlet thereof with a second valve, wherein the thermal management system may further include a projection pin, which is coupled to the connector or the vehicle and which projects toward the first valve or the second valve so as to open the first valve or the second valve.

The projection pin may be coupled to the connector via an elastic element and may project toward both the first valve and the second valve so as to open both the first valve and the second valve when the connector is coupled to the vehicle.

The thermal management system may further include a refrigerant pump, which is provided at the refrigerant supply line so as to supply the refrigerant in the reservoir tank to the connector through the refrigerant supply line upon activation thereof, and a controller for controlling the refrigerant pump so as to supply the refrigerant in the reservoir tank to the heat exchange circuit when the connector is coupled to the vehicle.

The refrigerant supply line may diverge into two branches and then the two branches may converge, a third valve and a fourth valve being respectively provided at the two diverging points, each of the third valve and the fourth valve being a 3-way valve and the refrigerant pump being positioned between the third valve and the fourth valve and being connected to the refrigerant supply line, wherein the controller may control the third valve, the fourth valve and the refrigerant pump to supply the refrigerant in the reservoir tank to the heat exchange circuit or to recover the refrigerant in the heat exchange circuit to the reservoir tank.

The connector may be electrically connected to a charging apparatus, which is positioned outside the vehicle and which is electrically connected to the battery upon coupling of the connector to the vehicle, and the controller may control a third valve, a fourth valve and the refrigerant pump to supply the refrigerant in the reservoir tank to the heat exchange circuit while the battery is charged by the charging apparatus.

The connector may be electrically connected to a charging apparatus, which is positioned outside the vehicle and which is electrically connected to the battery upon coupling of the connector to the vehicle, and the controller may control a third valve, a fourth valve and the refrigerant pump to supply the refrigerant in the heat exchange circuit to the reservoir tank when the battery is completely charged by the charging apparatus.

In accordance with another aspect of the present invention, a method of controlling a thermal management system for a vehicle battery includes controlling a refrigerant pump to supply refrigerant in a reservoir tank to a heat exchange circuit when coupling of a connector to a vehicle is detected.

In accordance with a further aspect of the invention, a thermal management system for a vehicle battery for cooling the battery while charging. The system comprises: a reservoir tank, which is positioned outside a vehicle and which stores refrigerant therein; a refrigerant supply line for supplying the refrigerant from the reservoir tank to a heat exchange circuit, which exchanges heat with the battery mounted in the vehicle; a refrigerant recovery line for recovering the refrigerant discharged from the heat exchanger circuit; a cable connected at one end thereof to the reservoir tank and including therein the refrigerant supply line or the refrigerant recovery line; and a connector provided at a remaining end of the cable, which serves to connect the refrigerant supply line or the refrigerant recovery line in the cable to an inlet or outlet of the heat exchange circuit when the connector is coupled to the vehicle. The connector is electrically connected to a charging apparatus, which is positioned outside the vehicle, and the charging apparatus is electrically connected to the battery when the connector is coupled to the vehicle. The connector includes a first valve, which blocks the refrigerant supply line or the refrigerant recovery line in the cable and which is opened when the connector is coupled to the vehicle.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF EMBODIMENTS

Figure 1:
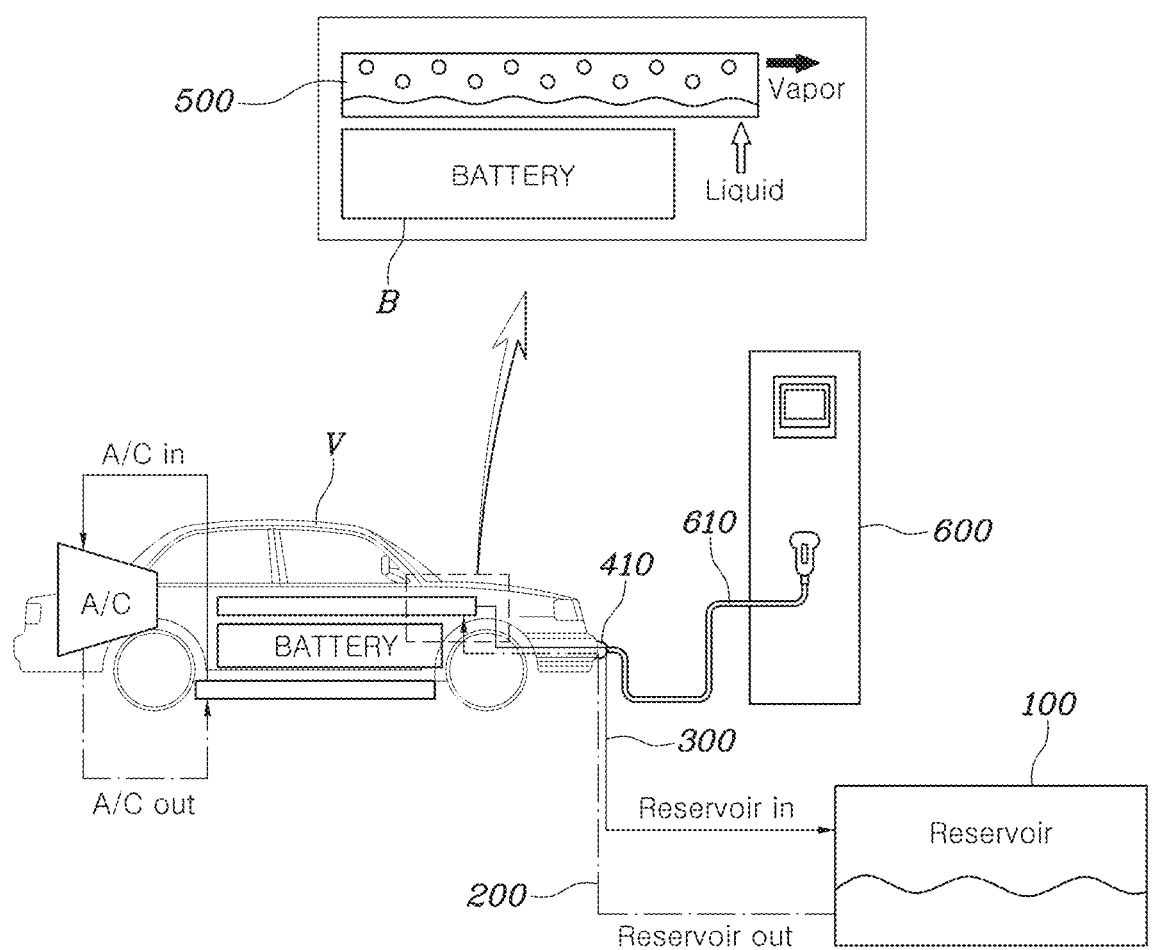
FIG. 1 is a view illustrating the construction of a thermal management system for a vehicle battery according to an embodiment of the present invention.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with embodiments thereof, it is to be understood that the present description is not intended to limit the present invention to those embodiments. On the contrary, the present invention is intended to cover not only the embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be understood in the same way.

The terminology used herein is for the purpose of describing particular embodiments only and is not intended to be limiting. As used herein, the singular forms "a" "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meaning as those commonly understood by one of ordinary skill in the art to which this invention belongs. It will be further understood that terms, such as those defined in commonly used dictionaries, should be interpreted as having meanings consistent with their meaning in the context of the relevant art and the present disclosure, and are not to be interpreted in an idealized or overly formal sense unless expressly so defined herein.

Hereinafter, embodiments of the present invention will be described in detail with reference to the accompanying drawings. Throughout the drawings, the same reference numerals will refer to the same or like parts.

An electric vehicle may be provided with a battery, which is adapted to be charged at a charging station. However, because a thermal load is increased in the case of fast charging for shortening a charging time, a battery may be overheated.

Figure 2:
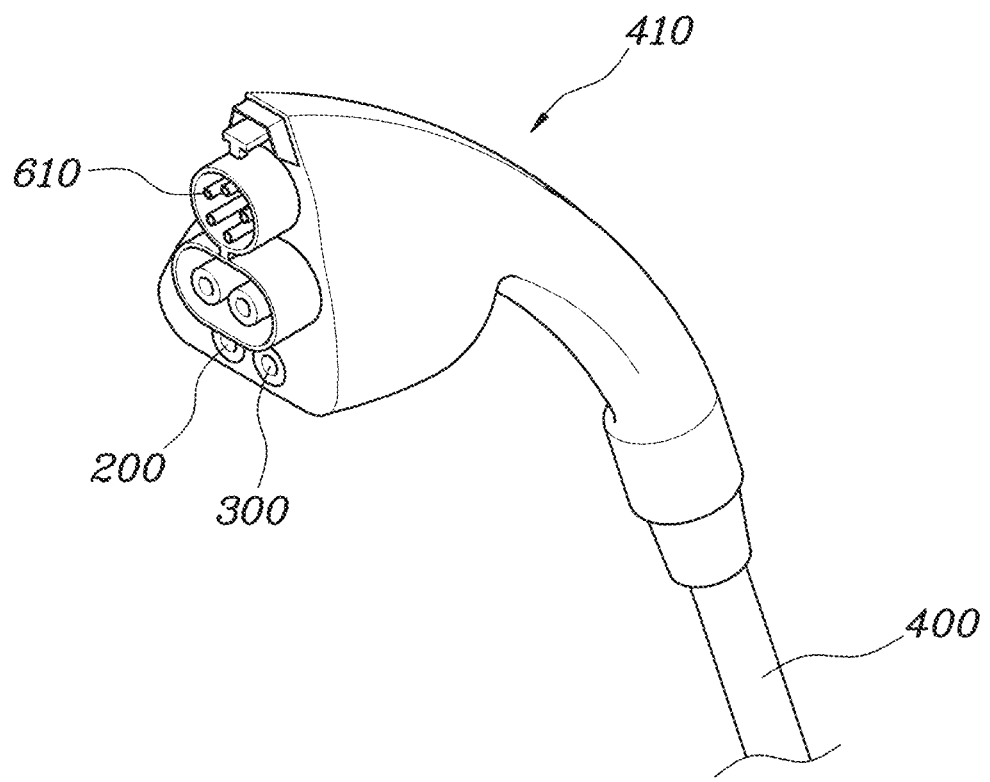
FIG. 2 is a view illustrating a connector according to an embodiment of the present invention.

FIG. 1 is a view illustrating the construction of a thermal management system for a battery B of a vehicle V according to an embodiment of the present invention. FIG. 2 is a view illustrating a connector 410 according to an embodiment of the present invention.

In embodiments, the battery B may be mounted in the vehicle V. Here, the battery B may be a plug-in-type battery, which is adapted to be charged by being connected to an external charging apparatus 600. Particularly, the battery B may be a large-capacity battery B for driving a motor mounted in the vehicle V.

When the vehicle V is driven by the motor, the battery B, which supplies power to the motor, may generate heat of about 0.5-3 kW. The battery B, which generates heat during travelling thereof, may be cooled by an additional cooling system (A/C) mounted in the vehicle V.

When the battery B is charged by the external charging apparatus 600, the battery generates a relatively large amount of heat. Particularly, when the battery B is charged quickly, the battery B generates heat of 7 kW or more. Hence, because the cooling system (A/C) mounted in the vehicle V is insufficient to cool the battery B, it is difficult to maintain the fast charge.

Furthermore, when the cooling capacity of the cooling system (A/C) mounted in the vehicle V is increased, there may be inefficiency in terms of weight and layout.

Referring to FIGS. 1 and 2, the thermal management system for a battery B of a vehicle V according to an embodiment of the present invention, includes a reservoir tank 100, which is positioned outside the vehicle V and which stores refrigerant therein, a refrigerant supply line 200 for supplying the refrigerant from the reservoir tank 100 to a heat exchange circuit 500, which exchanges heat with the battery B mounted in the vehicle V, a refrigerant recovery line 300 for recovering the refrigerant discharged from the heat exchanger circuit 500, a cable 400, which is connected at one end thereof to the reservoir tank 100 and which includes therein the refrigerant supply line 200 or the refrigerant recovery line 300, and a connector 410 provided at the other end of the cable 400, which serves to connect the refrigerant supply line 200 or the refrigerant recovery line 300 in the cable 400 to the inlet or outlet of the heat exchange circuit 500 when the connector 410 is coupled to the vehicle V. In one embodiment, the cable includes both lines 200 and 300. In another embodiment, the cable includes either one of the line 200 and the line 300.

In embodiments, the reservoir tank 100 may be positioned outside the vehicle V, and may store therein a large amount of refrigerant. Here, the refrigerant may be 2-phase refrigerant to be described later, or may be cooling water or generally used refrigerant. Particularly, the reservoir tank 100 may be positioned at a charging station in which the charging apparatus 600 for charging the battery B is provided.

The battery B of the vehicle V may be provided with the heat exchange circuit 500. The heat exchange circuit 500 may be positioned adjacent to the battery B so as to perform heat exchange with the battery B. The heat exchange circuit 500 may be constructed separately from the cooling system (A/C) mounted in the vehicle V itself.

In embodiments, the refrigerant supply line 200 may be a flow path, which is connected to the inlet of the heat exchange circuit 500 of the vehicle V so as to supply the refrigerant in the reservoir tank 100 to the heat exchanger circuit 500. The refrigerant recovery line 300 may be a flow path, which is connected to the outlet of the heat exchange circuit 500 of the vehicle V so as to recover the refrigerant that has exchanged heat with the battery B, to the reservoir tank 100.

The refrigerant supply line 200 and the refrigerant recovery line 300 may be provided in the cable 400 and may be integrally connected to the reservoir tank 100. One end of the cable 400 may be connected to the reservoir tank 100, and the other end of the cable 400 may be provided with the connector 410.

The connector 410, which is detachably coupled to the vehicle V, serves to connect the refrigerant supply line 200 or the refrigerant recovery line 300 of the cable 400 to the inlet or the outlet of the heat exchange circuit 500 when coupled to the vehicle V or serves to separate the refrigerant supply line 200 or the refrigerant recovery line 300 of the cable 400 from the inlet or the outlet of the heat exchange circuit 500 when separated from the vehicle V.

Consequently, since it is possible to cool the battery B of the vehicle V using the external device, thus reducing the burden on the cooling system (A/C) mounted in the vehicle V, there are advantageous effects in terms of cost, weight and layout.

The connector 410 may be electrically connected to the charging apparatus 600, which is positioned outside the vehicle V. The charging apparatus 600 may be electrically connected to the battery B when the connector 410 is coupled to the vehicle V.

The charging apparatus 600 may be positioned at a charging station and may be electrically connected to the battery B so as to charge the battery B when coupled to the vehicle V via the connector 410. A power supply line 610 of the charging apparatus 600 may be integrally included in the cable 400, or may be constructed separately and may be connected to the connector 410.

The cable 400 may integrally include therein the power supply line 610 and the connector 410 for electrical connection between the battery B of the vehicle V and the charging apparatus 600. Consequently, the electrical connection between the charging apparatus 600 and the battery B for electrical charging and the connection between the reservoir tank 100 and the heat exchange circuit 500 for refrigerant circulation may be concurrently implemented via the connector 410 and the cable 400.

The reservoir tank 100 may be partially or completely buried so as to perform heat exchange between the surface thereof and the ambient environment or surrounding of the tank. Particularly, the reservoir tank 100 may be buried in the earth so as to be cooled or heated by geothermal heat for heat exchange with the ambient environment.

Alternatively, the reservoir tank 100 may be submerged in water, such as a lake, a river or a sea, so as to exchange heat with the ambient environment.

Accordingly, since the reservoir tank 100 continuously exchanges heat with the ambient environment, which is maintained at a constant temperature, the reservoir tank 10 has an effect of being maintained at a constant temperature without using an additional apparatus.

Figure 3:
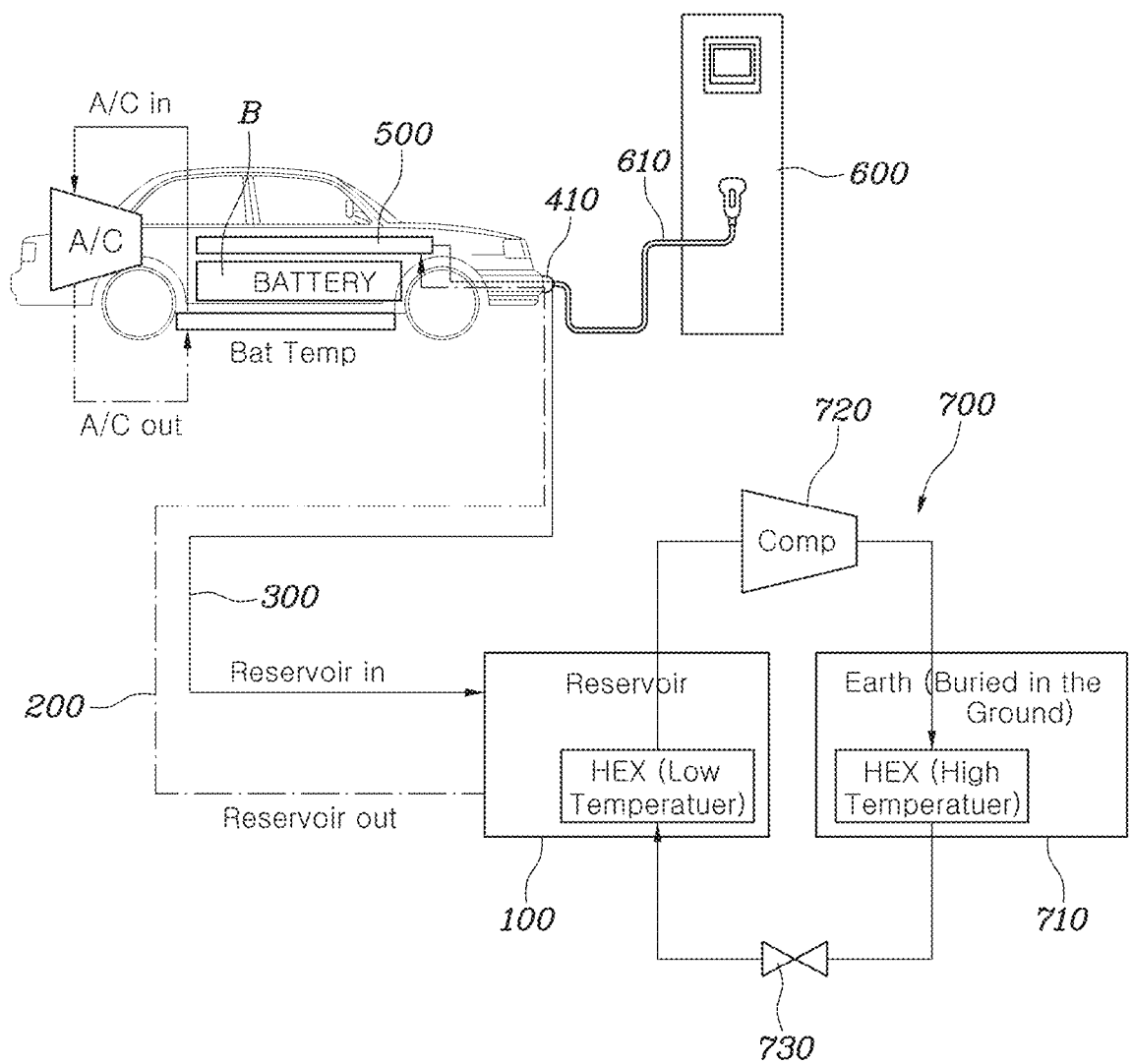
FIG. 3 is a view illustrating the construction of a thermal management system for a vehicle battery according to another embodiment of the present invention.

FIG. 3 is a view illustrating the construction of a thermal management system for a battery B of a vehicle V according to another embodiment of the present invention.

Referring to FIG. 3, the thermal management system according to another embodiment of the present invention may further include a heat source 710, which is partially or completely buried so as to exchange heat between the surface thereof and the ambient environment. The reservoir tank 100 may be connected to the heat source 710 via a heat pump system 700 so as to be maintained at a lower temperature than the heat source 710.

When the ambient temperature of the reservoir tank 100 is higher than the target temperature of the reservoir tank 100, e.g., when the reservoir tank 100 may need to be maintained at a temperature lower than the ambient temperature of the reservoir tank 100, an additional heat source and heat pump system 700 may be required.

The heat source 710, which has a high thermal capacity, may be constantly maintained at almost the same temperature as the ambient temperature, and the reservoir tank 100 may be maintained at a temperature lower than the heat source 710 by means of the heat pump system 700.

The heat pump system 700 according to an embodiment may be constructed such that the reservoir tank 100 and the heat source 710 are connected to each other via an additional refrigerant line and such that the refrigerant, which is heated while passing through the heat source 710 and is then cooled while passing through an expansion valve, is supplied to the reservoir tank 100 so as to cool the reservoir tank 100. The refrigerant, which cools the reservoir tank 100 and is thus heated, may be supplied to the heat source 710 through a compressor 720.

Accordingly, even when the desired temperature of the reservoir tank 100 and the refrigerant is lower than the ambient temperature, there is an effect in that it is possible to cool the reservoir tank 100.

The mass of the refrigerant stored in the reservoir tank 100 may be higher than the mass of the maximum amount of refrigerant that can be introduced into the heat exchange circuit 500.

The greater the thermal capacity of the reservoir tank 100 containing the refrigerant therein and the heat source 710, the smaller variation in temperature thereof, so a large amount of refrigerant may be stored in the reservoir tank 100. Particularly, the mass of the refrigerant stored in the reservoir tank 100 may be higher than the total mass of the refrigerant that flows in the heat exchange circuit 500 or the mass of the maximum amount of refrigerant that can be introduced into the heat exchange circuit.

Accordingly, regardless of continuous cooling of the battery B, there may be no variation in the temperature of the refrigerant supplied from the reservoir tank 100.

Referring again to FIG. 1, the refrigerant in the liquid state may be supplied through the refrigerant supply line 200 to the heat exchange circuit 500 in which the refrigerant vaporizes, and the refrigerant in the gaseous state may be recovered through the refrigerant recovery line 300.

In other words, the refrigerant may be 2-phase refrigerant, which is changed in phase in the heat exchange circuit 500. Accordingly, because the 2-phase refrigerant utilizes latent heat, the quantity of refrigerant required by the heat exchange circuit 500 is reduced compared to 1-phase refrigerant, which utilizes sensible heat, thereby offering an effect of reducing the amount of energy required to transfer the refrigerant.

Specifically, the required amount energy required for cooling using latent heat may be calculated using the following equation.

$$Q = P \times t = m \times r$$

wherein Q is the total cooling rate [kJ], P is the required cooling amount [kW], m is the mass of refrigerant and r is latent heat.

Hence, the flow rate of refrigerant ($\dot{m}$) may be calculated as follows.

$$\dot{m} = \frac{P}{r} \ [\ell/min]$$

For example, assuming that refrigerant at 25° C. is required at 30 $\ell$/min when the required cooling amount of the battery B is 7 kW, the refrigerant may be required at about 1-3 $\ell$/min when using latent heat (r: 140 kJ/kg) due to vaporization.

Consequently, when latent heat is utilized, the flow rate of refrigerant is remarkably decreased, thereby offering an effect of remarkably reducing the amount of energy required to make the refrigerant flow.

Here, the refrigerant may have a temperature of vaporization within the target temperature range of the battery B. For example, the refrigerant may have a temperature of vaporization of 30-50° C., and may thus be vaporized by the battery B, which is heated by the heat exchange circuit 500.

Figure 4A:
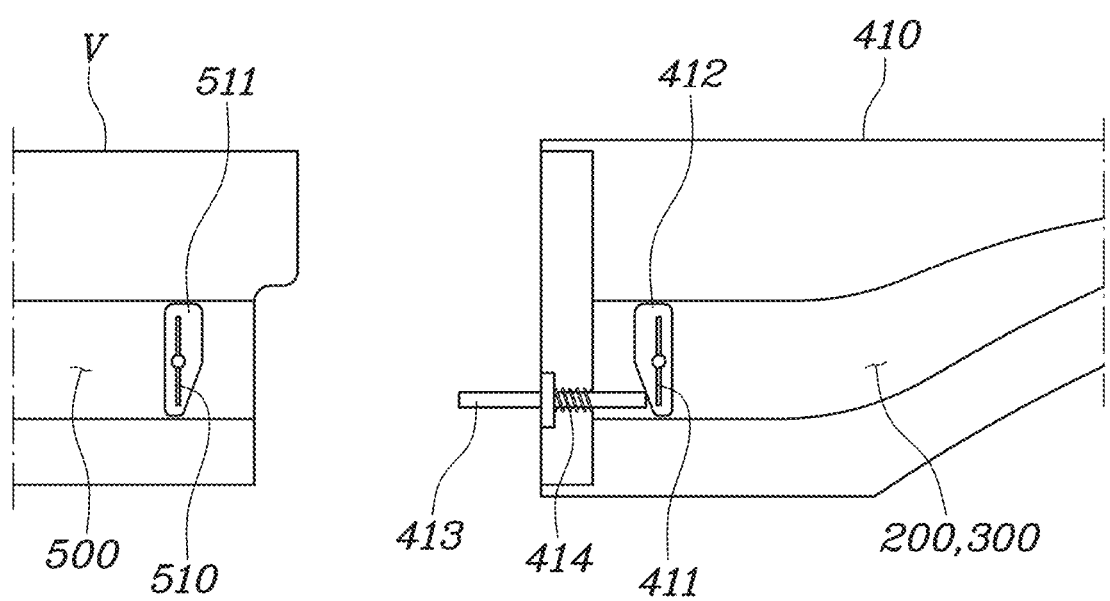
FIGS. 4A and 4B are views illustrating the connection structure between the connector and the vehicle according to an embodiment of the present invention.
Figure 4B:
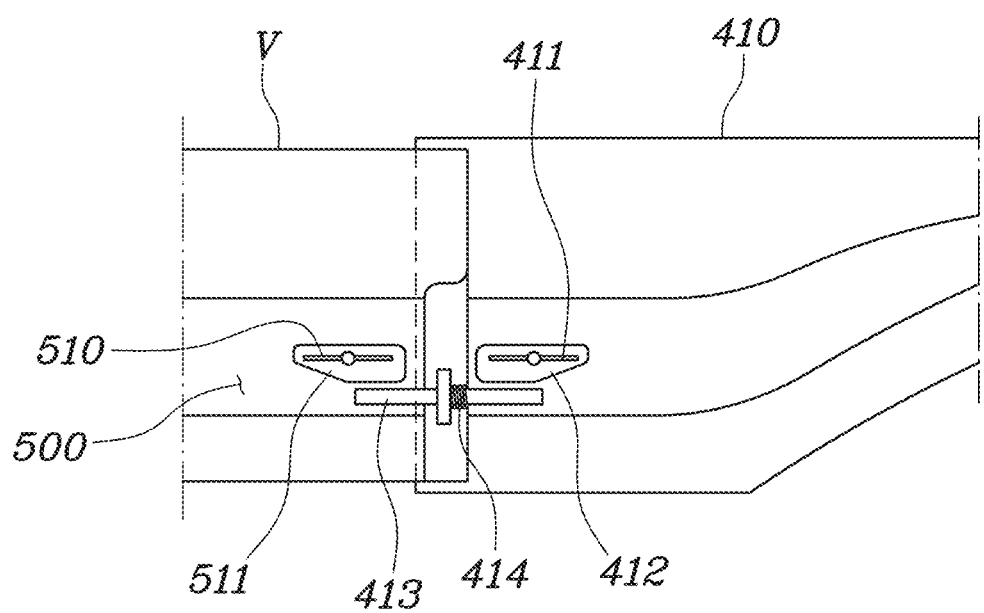

FIGS. 4A and 4B are views illustrating the connection structure between the connector 410 and the vehicle V according to an embodiment of the present invention.

Referring to FIGS. 2, 4A and 4B, the connector 410 may be provided with a first valve 411, which serves to block the refrigerant supply line 200 or the refrigerant recovery line 300 in the cable 400 and which is opened when the connector 410 is coupled to the vehicle V.

In an embodiment, the refrigerant supply line 200 and the refrigerant recovery line 300 may be respectively provided with the first valves 411. Alternatively, the first valves 411 may further be provided with valve guides 412, which are connected to each other so as to allow the first valves 411 to be simultaneously opened or closed. The first valve 411 may be a check valve, which serves to block the refrigerant supply line 200 or the refrigerant recovery line 300 when the connector 410 is separated from the vehicle V and to open the refrigerant supply line 200 or the refrigerant recovery line 300 when the connector 410 is coupled to the vehicle V.

The inlet or outlet of the heat exchange circuit 500 is provided with a second valve 510, which serves to block the heat exchange circuit 500. The second valve 510 may be opened when the connector 410 is coupled to the vehicle V.

In an embodiment, the inlet and the outlet of the heat exchange circuit 500 may be respectively provided with the second valves 510. Alternatively, the second valves 510 may further be provided with valve guides 511, which are connected to each other so as to allow the second valves 610 to be simultaneously opened or closed. The second valve 510 may be a check valve, which serves to block the inlet or the outlet of the heat exchange circuit 500 when the connector 410 is separated from the vehicle V and to open the inlet or the outlet of the heat exchange circuit 500 when the connector 410 is coupled to the vehicle V.

In another embodiment, the first valve 411 and the second valve 510 may be controlled to open or close in response to detection of the coupling between the connector 410 and the vehicle V.

The system according to an embodiment of the present invention may further include a projection pin 413, which is coupled to the vehicle V and which projects toward the first valve 411 or the second valve 510 so as to open the first valve 411 or the second valve 510.

The projection pin 413 is configured so as to project toward the first valve 411 or the second valve 510, and is coupled to the connector 410 or the vehicle V. Accordingly, when the connector 410 is coupled to the vehicle V, the projection pin 413 presses and rotates the first valve 411 or the second valve 510, thereby opening the first valve 411 or the second valve 510.

The connector 410 and the vehicle V may be provided with respective projection pins 413 so as to respectively rotate and open the second valve 510 and the first valve 411 when the connector 410 is coupled to the vehicle V.

In an embodiment, the projection pin 413 may be coupled to the connector 410 via an elastic element 414 and may project toward both the first valve 411 and the second valve 510 so as to open both the first valve 411 and the second valve 510 when the connector 410 is coupled to the vehicle V.

Specifically, the projection pin 413 is configured so as to project toward both the first valve 411 and the second valve 510. Consequently, when the connector 410 is coupled to the vehicle V, the second valve 510 of the vehicle V may be rotated and opened by pressing the projection pin 413. Meanwhile, when the connector 410 is coupled to the vehicle V, the projection pin 413 may slide toward the first valve 411 while deforming the elastic element 414, thereby rotating and opening the first valve 411.

As a result, there is an effect of simultaneously opening the first valve 411 and the second valve 510 using a single projection pin 413 when the connector 410 is coupled to the vehicle V.

In another embodiment, the projection pin 413 may also be coupled to the vehicle V via the elastic element 414.

Figure 5A:
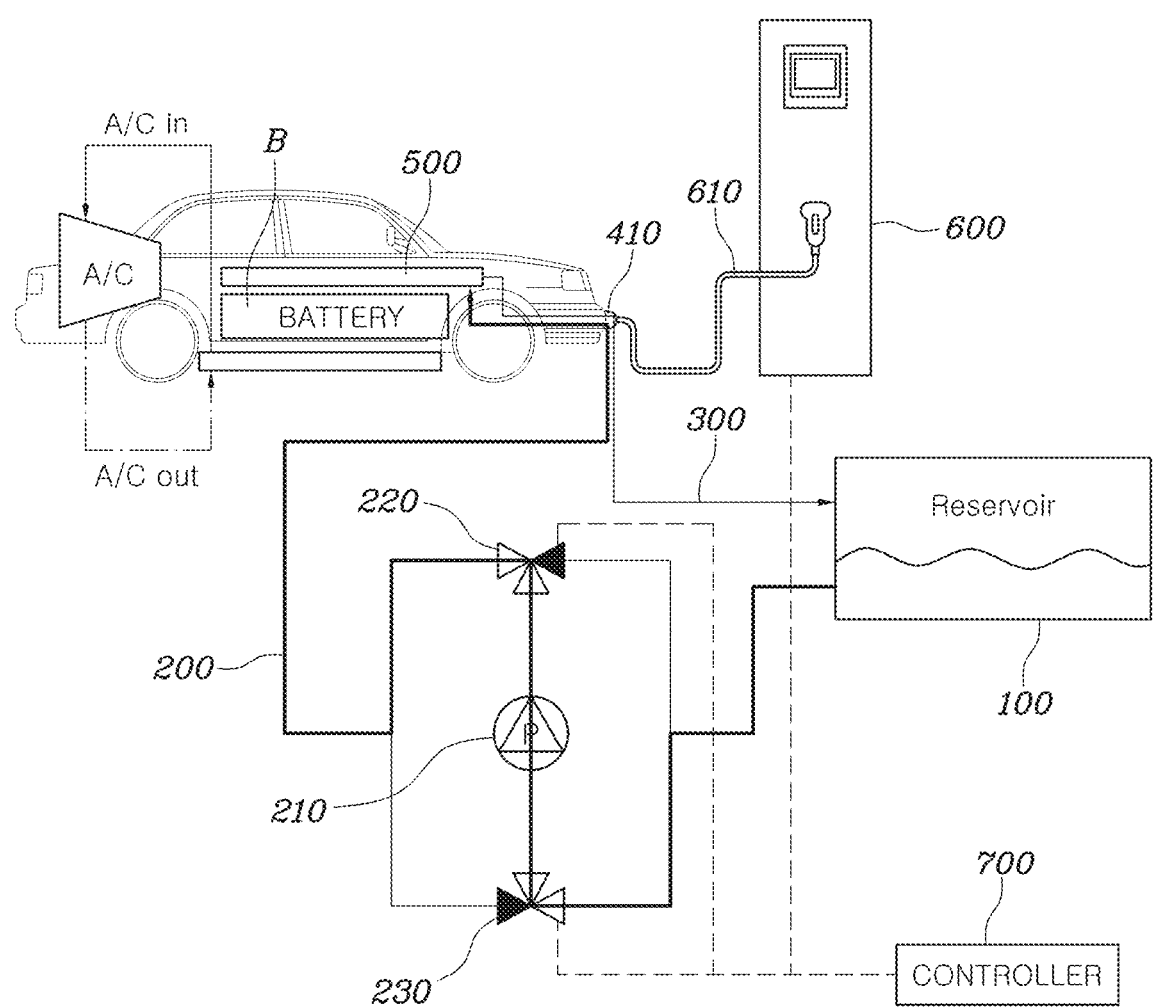
FIGS. 5A and 5B are views illustrating the supply and recovery of refrigerant in the thermal management system for the vehicle battery according to an embodiment of the present invention.
Figure 5B:
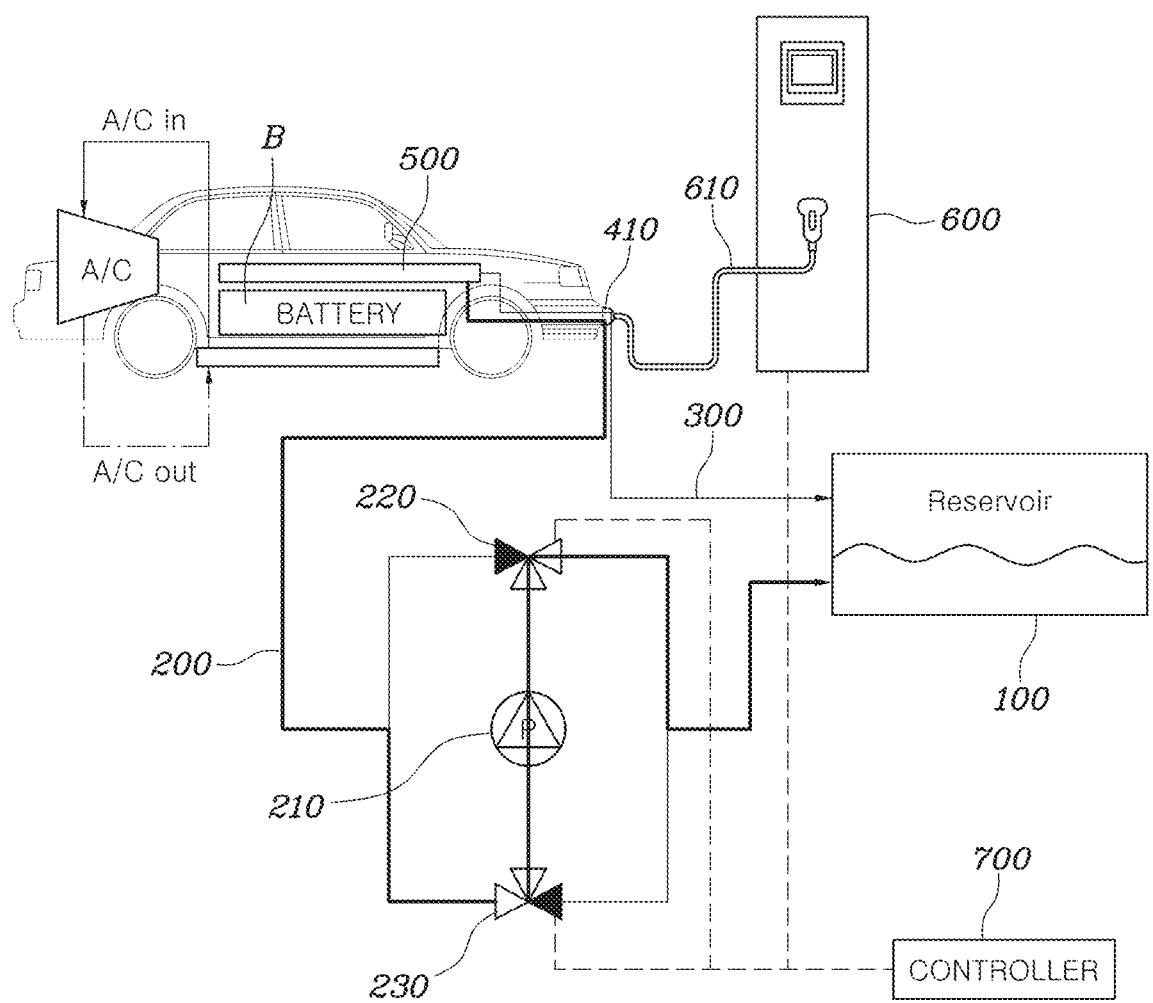

FIG. 5A is a view illustrating the supply of refrigerant in the thermal management system for the battery B of the vehicle V according to an embodiment of the present invention. FIG. 5B is a view illustrating the recovery of refrigerant in the thermal management system for the battery B of the vehicle V according to an embodiment of the present invention.

Referring to FIGS. 5A and 5B, the thermal management system for the battery B of the vehicle V according to an embodiment of the present invention may further include a refrigerant pump 210, which is provided at the refrigerant supply line 200 so as to supply the refrigerant in the reservoir tank 100 to the connector 410 through the refrigerant supply line 200 upon activation thereof, and a controller 700 for controlling the refrigerant pump 210 so as to supply the refrigerant in the reservoir tank 100 to the heat exchange circuit 500 when the connector 410 is coupled to the vehicle V.

The refrigerant pump 210 may be positioned at the refrigerant supply line 200 so as to cause the flow of the refrigerant, e.g., so as to supply the refrigerant stored in the reservoir tank 100 to the connector 410. The controller 700 controls the operation of the refrigerant pump 210 such that the refrigerant in the reservoir tank 100 is supplied to the heat exchange circuit 500 when the connector 410 is coupled to the vehicle V.

When the connector 410 is separated from the vehicle V, the first valve 411 is closed and the refrigerant in the reservoir tank 100 is thus not supplied to the outside even when the refrigerant pump 210 is activated. Accordingly, the controller 700 may perform control such that the refrigerant pump 210 is activated only when the connector 410 is coupled to the vehicle V.

The refrigerant in the liquid state, which is supplied from the reservoir tank 100 through the refrigerant supply line 200, may vaporize, and the refrigerant in the gaseous state may be recovered to the reservoir tank 100 through the refrigerant recovery line 300. However, the refrigerant remains in the heat exchanger circuit 500 of the vehicle V, thereby increasing the weight of the vehicle V. Because the refrigerant is an expensive resource of the charging station, the refrigerant may need to be recovered to the reservoir tank 100.

Although the vaporized refrigerant may be recovered through the refrigerant recovery line 300, the refrigerant in the liquid state that is not vaporized may be recovered through the refrigerant supply line 200.

Specifically, the refrigerant supply line 200 may diverge into two branches and then the two branches converges, and a third valve 220 and a fourth valve 230 may be respectively provided at the two diverging points. Each of the third valve 220 and the fourth valve 230 may be a 3-way valve, and the refrigerant pump 210 may be positioned between the third valve 220 and the fourth valve 230 and may be connected to the refrigerant supply line 200. The controller 700 may control the third valve 220, the fourth valve 230 and the refrigerant pump 210 to supply the refrigerant in the reservoir tank 100 to the heat exchange circuit 500 or to recover the refrigerant in the heat exchange circuit 500 to the reservoir tank 100.

Specifically, each of the third valve 220 and the fourth valve 230 may be a 3-way valve. First and second ports of each of the third valve 220 and the fourth valve 230 may be connected to each of the diverging points of the refrigerant supply line 200, and the third ports of the third valve 220 and the fourth valve 230 may be connected to each other. The refrigerant pump 210 may be positioned between the third ports of the third valve 220 and the fourth valve 23, and may be connected thereto.

Consequently, although the refrigerant pump 210 pumps the refrigerant in only one direction, it is possible to supply the refrigerant in the reservoir tank 100 to the heat exchange circuit 500 through the refrigerant supply line 200 or to recover the refrigerant in the heat exchange circuit 50 to the reservoir tank 100 by control of the third valve 220 and the fourth valve 230.

By way of example, the refrigerant in the reservoir tank 100 may be supplied to the heat exchange circuit 500 by the refrigerant pump 210 when the third valve 220 and the fourth valve 230 are opened, as illustrated in FIG. 5A, and the refrigerant in the heat exchange circuit 500 may be supplied to the reservoir tank 100 by the refrigerant pump 210 when the third valve 220 and the fourth valve 230 are opened, as illustrated in FIG. 5B.

In another embodiment, the refrigerant pump 210 may also be embodied so as to generate pressure in two directions.

The refrigerant that remains in the heat exchange circuit 500 even after the recovery of refrigerant through the refrigerant supply line 200 is completed, may vaporize due to heating of the battery B and may be recovered to the refrigerant recovery line 300.

In a method of controlling the thermal management system for the battery B of the vehicle V according to an embodiment of the present invention, when coupling of the connector 410 to the vehicle V is detected, it is possible to control the refrigerant pump 210 to supply the refrigerant in the reservoir tank 100 to the heat exchange circuit 500.

The controller 700 may detect the coupling of the connector 410 to the vehicle V. When the coupling of the connector 410 to the vehicle V is detected, the controller 700 may control the charging apparatus 600 so as to charge the battery B.

Particularly, the connector 410 may be electrically connected to the charging apparatus 600, which is positioned outside the vehicle V, and the charging apparatus 600 may be electrically connected to the battery B upon coupling of the connector 410 to the vehicle V.

The controller 700 may control the third valve 220, the fourth valve 230 and the refrigerant pump 210 to supply the refrigerant in the reservoir tank 100 to the heat exchange circuit 500 while the battery B is charged by the charging apparatus 600.

Furthermore, when the battery B is completely charged by the charging apparatus 60, the controller 700 may control the third valve 220, the fourth valve 230 and the refrigerant pump 210 to recover the refrigerant in the heat exchange circuit 500 to the reservoir tank 100.

In addition, the controller 700 may monitor the state in which the battery B is charged by the charging apparatus 600 through the connector 410. The controller 700 may control the third valve 220, the fourth valve 230 and the refrigerant pump 210 to supply the refrigerant in the reservoir tank 100 to the heat exchange circuit 500 while the battery B is charged.

When the battery B is completely charged, when the battery B is being charged slowly due to the impossibility of fast charging or when predetermined conditions (time, voltage, charge amount and the like), which are set at a time close to the time the battery B is completely charged, are satisfied, the controller 700 may control the third valve 220, the fourth valve 230 and the refrigerant pump 210 to recover the refrigerant in the heat exchanger circuit 500 to the reservoir tank 100.

As is apparent from the above description, the thermal management system for a vehicle battery according to embodiments of the present invention offers an effect of making it possible to cool the vehicle battery using an external device.

Furthermore, the thermal management system for a vehicle battery according to embodiments of the present invention offers an effect of minimizing or reducing inefficiency in cost, weight and layout, which occur when cooling capacity of a vehicle is increased in order to reduce a high thermal load that is generated only at the time of fast charging.

In addition, the thermal management system for a vehicle battery according to embodiments of the present invention offers an effect of minimizing the flow of refrigerant by utilizing latent heat attributable to phase change.

In embodiments, the connector includes an end of the refrigerant supply line, an end of the refrigerant return line and the end terminals of the electric charging line that are integrated in one body of the connector, while the vehicle includes a receptable that include the refrigerant inlet, the refrigerant outlet and an end terminals of electric charging port. A method of charging an electric vehicle includes providing an electric vehicle having the receptacle, providing the charging-and-thermal management system having the connector, connecting the connector to the receptacle for forming a refrigerant circulating line, charging the vehicle, and circulating the refrigerant while charging to cool the battery in the vehicle.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thermal management system for a vehicle battery, the thermal management system comprising:
   a reservoir tank positioned outside a vehicle and configured to store refrigerant therein;
   a refrigerant supply line for supplying the refrigerant from the reservoir tank to a heat exchange circuit, which is configured to exchange heat with the vehicle battery mounted in the vehicle;
   a refrigerant recovery line for recovering the refrigerant discharged from the heat exchanger circuit;
   a cable connected at one end thereof to the reservoir tank and comprising at least one of the refrigerant supply line and the refrigerant recovery line; and
   a connector provided at a remaining end of the cable, which is configured to connect the at least one of the refrigerant supply line and the refrigerant recovery line in the cable to the heat exchange circuit when the connector is coupled to the vehicle,
   wherein the reservoir tank is partially or completely buried so as to perform heat exchange between a surface thereof and an ambient environment.

2. The thermal management system according to claim 1, wherein the connector is electrically connected to a charging apparatus, which is positioned outside the vehicle, and the charging apparatus is electrically connected to the vehicle battery when the connector is coupled to the vehicle.

3. The thermal management system according to claim 1, further comprising: a heat source, which is partially or completely buried so as to exchange heat between a surface thereof and an ambient environment,
   wherein the reservoir tank is connected to the heat source via a heat pump system so as to be maintained at a lower temperature than the heat source.

4. The thermal management system according to claim 1, wherein a mass of the refrigerant stored in the reservoir tank is greater than a mass of a maximum amount of refrigerant that can be introduced into the heat exchange circuit.

5. The thermal management system according to claim 1, wherein the refrigerant is supplied in a liquid state through the refrigerant supply line to the heat exchange circuit in which the refrigerant vaporizes, and the refrigerant in a gaseous state is recovered through the refrigerant recovery line.

6. The thermal management system according to claim 1, wherein the connector includes a first valve, which blocks the refrigerant supply line or the refrigerant recovery line in the cable and which is opened when the connector is coupled to the vehicle.

7. The thermal management system according to claim 1, wherein an inlet or an outlet of the heat exchange circuit is provided with a second valve, which blocks the heat exchange circuit, the second valve being opened when the connector is coupled to the vehicle.

8. The thermal management system according to claim 1, wherein the connector includes therein a first valve for blocking the refrigerant supply line or refrigerant recovery line in the cable, and the heat exchange circuit is provided at an inlet or outlet thereof with a second valve, and wherein the thermal management system further includes a projection pin, which is coupled to the connector or the vehicle and which projects toward the first valve or the second valve so as to open the first valve or the second valve.

9. The thermal management system according to claim 8, wherein the projection pin is coupled to the connector via an elastic element and projects toward both the first valve and the second valve so as to open both the first valve and the second valve when the connector is coupled to the vehicle.

10. The thermal management system according to claim 1, further comprising:

a refrigerant pump, which is provided at the refrigerant supply line so as to supply the refrigerant in the reservoir tank to the connector through the refrigerant supply line upon activation thereof; and a controller for controlling the refrigerant pump so as to supply the refrigerant in the reservoir tank to the heat exchange circuit when the connector is coupled to the vehicle.

11. The thermal management system according to claim 10, wherein the refrigerant supply line diverges into two branches and then the two branches converge, a third valve and a fourth valve being respectively provided at the two diverging points, each of the third valve and the fourth valve being a 3-way valve and the refrigerant pump being positioned between the third valve and the fourth valve and being connected to the refrigerant supply line, and wherein the controller controls the third valve, the fourth valve and the refrigerant pump to supply the refrigerant in the reservoir tank to the heat exchange circuit or to recover the refrigerant in the heat exchange circuit to the reservoir tank.

12. The thermal management system according to claim 10, wherein the connector is electrically connected to a charging apparatus, which is positioned outside the vehicle and which is electrically connected to the vehicle battery upon coupling of the connector to the vehicle, and wherein the controller controls a third valve, a fourth valve and the refrigerant pump to supply the refrigerant in the reservoir tank to the heat exchange circuit while the vehicle battery is charged by the charging apparatus.

13. The thermal management system according to claim 10, wherein the connector is electrically connected to a charging apparatus, which is positioned outside the vehicle and which is electrically connected to the vehicle battery upon coupling of the connector to the vehicle, and wherein the controller controls a third valve, a fourth valve and the refrigerant pump to supply the refrigerant in the heat exchange circuit to the reservoir tank when the vehicle battery is completely charged by the charging apparatus.

14. A thermal management system for a vehicle battery, the thermal management system comprising:

a reservoir tank positioned outside a vehicle and configured to store refrigerant therein;

a refrigerant supply line for supplying the refrigerant from the reservoir tank to a heat exchange circuit, which is configured to exchange heat with the vehicle battery mounted in the vehicle;

a refrigerant recovery line for recovering the refrigerant discharged from the heat exchanger circuit;

a cable connected at one end thereof to the reservoir tank and comprising at least one of the refrigerant supply line and the refrigerant recovery line; and a connector provided at a remaining end of the cable, which is configured to connect the at least one of the refrigerant supply line and the refrigerant recovery line in the cable to the heat exchange circuit when the connector is coupled to the vehicle, wherein the connector includes a first valve, which blocks the refrigerant supply line or the refrigerant recovery line in the cable and which is opened when the connector is coupled to the vehicle.

15. A thermal management system for a vehicle battery, the thermal management system comprising:

a reservoir tank positioned outside a vehicle and configured to store refrigerant therein;

a refrigerant supply line for supplying the refrigerant from the reservoir tank to a heat exchange circuit, which is configured to exchange heat with the vehicle battery mounted in the vehicle;

a refrigerant recovery line for recovering the refrigerant discharged from the heat exchanger circuit;

a cable connected at one end thereof to the reservoir tank and comprising at least one of the refrigerant supply line and the refrigerant recovery line; and a connector provided at a remaining end of the cable, which is configured to connect the at least one of the refrigerant supply line and the refrigerant recovery line in the cable to the heat exchange circuit when the connector is coupled to the vehicle, wherein an inlet or an outlet of the heat exchange circuit is provided with a second valve, which blocks the heat exchange circuit, the second valve being opened when the connector is coupled to the vehicle.

* * * * *